US006438130B1

(12) United States Patent
Kagan et al.

(10) Patent No.: US 6,438,130 B1
(45) Date of Patent: Aug. 20, 2002

(54) FORWARDING DATABASE CACHE

(75) Inventors: Michael Kagan, Zichron Yaacov; Freddy Gabbay, Tel Aviv; Alon Webman, Kiryat Ono; Diego Crupnicoff, Haifa, all of (IL)

(73) Assignee: Mellanox Technologies Ltd., Yokneam (IL)

( * ) Notice: Subject to any disclaimer, the term of this patent is extended or adjusted under 35 U.S.C. 154(b) by 0 days.

(21) Appl. No.: 09/892,852

(22) Filed: Jun. 28, 2001

(51) Int. Cl.[7] .......................... H04L 12/28; H04L 12/56

(52) U.S. Cl. ........................ 370/392; 370/400; 359/128

(58) Field of Search ................................ 370/389, 351, 370/395.1, 395.52, 395.5, 395, 53, 395.6, 392, 387, 367, 396–397, 400, 401, 419, 420, 436; 359/120, 121, 123, 124, 115, 117, 118, 128

(56) References Cited

U.S. PATENT DOCUMENTS 5,859,718 A * 1/1999 Yamamoto et al.

OTHER PUBLICATIONS

Daniel Cassiday, Infiniband Architecture Tutorial, Hot Chips, Aug. 2000, Sun Microsystems, 79 pages.* http://www.infinibandta.org, 1999–2000.

* cited by examiner

*Primary Examiner*—William Luther
(74) *Attorney, Agent, or Firm*—Greenblum & Bernstein, P.L.C.

(57) ABSTRACT

A device for switching packets in a network includes a switching core and a plurality of ports, coupled to pass the packets from one to another through the switching core. The ports include, with respect to each packet among the packets switched by the device, a receiving port, coupled to receive the packet from a packet source, and a destination port, to which the packet is passed for conveyance to a packet destination. The ports also include one or more cache memories, respectively associated with one or more of the ports, each of the cache memories being configured to hold a forwarding database cache for reference by the receiving port with which the cache memory is associated in determining the destination port of the packet.

28 Claims, 4 Drawing Sheets

30
LID
34
32
28
TARGET
DATA
CTRL
TARGET
DATA
CTRL
36
40
42
44
38
40
42
44

20
PORT 0
PORT 1
PORT 2
PORT 3
PORT 5
PORT 6
PORT 7
PORT 8
22
SWITCHING CORE
24
PACKET IN
PACKET OUT
LID
PORT #
FDB CACHE
28
FORWARD DATABASE
26

28
30
LID
32
34
36
38
TARGET
DATA
CTRL
40
42
44
TARGET
DATA
CTRL
40
42
44

CHECK CACHE ROW INDEXED BY LSB OF LID
50
FORCE HIT SET ?
52
NO
YES
READ AND USE CACHED PORT
54
MSB MATCH TO TARGET ?
56
NO
YES
READ PORT FROM DATABASE
62
READ PORT FROM DATABASE
58
UPDATE LRU FLAG
60
CACHE ENTRY LOCKED ?
64
YES
NO
OVERWRITE LEAST RECENTLY USED ENTRY
66
DONE

FORWARDING DATABASE CACHE

FIELD OF THE INVENTION

The present invention relates generally to switch fabrics, and specifically to efficient switching of packets within switch fabrics.

BACKGROUND OF THE INVENTION

The computer industry is moving toward fast, packetized, serial input/output (I/O) bus architectures, in which computing hosts and peripherals are linked by a switching network, commonly referred to as a switch fabric. A number of architectures of this type have been proposed, culminating in the "InfiniBand™" (IB) architecture, which has been advanced by a consortium led by a group of industry leaders (including Intel, Sun Microsystems, Hewlett Packard, IBM, Compaq, Dell and Microsoft). The IB architecture is described in detail in the InfiniBand Architecture Specification, Release 1.0, which is available from the InfiniBand Trade Association at www.infinibandta.org and is incorporated herein by reference.

As in other packet networks, each InfiniBand packet carries a media access control (MAC) address, known in InfiniBand parlance as a Local Identifier (LID), which is used by switches in the fabric to convey the packet to its destination. Each InfiniBand switch maintains a Forwarding Database (FDB), listing the correspondence between the LIDs of incoming packets and the ports of the switch. When the switch receives a packet at one of its ports, it looks up the LID of the packet in its FDB in order to determine the destination port through to which the packet should be switched for output. Since the LID field is 16 bits long, the FDB may have up to 64K ($2^{16}$) entries. The InfiniBand standard specifies that the first 48K entries in the FDB are used for unicast packet LIDs, while the final 16K entries are reserved for multicast LIDs. The need to look up every incoming packet in the 64K FDB places a strain on processing resources in the switch, making it difficult to maintain wire-speed switching operation.

SUMMARY OF THE INVENTION

It is an object of the present invention to provide improved devices and methods for switching packets in a switch fabric.

It is a further object of some aspects of the present invention to enhance the speed with which a switch in a switch fabric or other network can process a packet.

It is yet a further object of some aspects of the present invention to enhance the versatility of switch devices used in a switch fabric.

In preferred embodiments of the present invention, each port in a high-speed switch comprises a forwarding database cache, referred to hereinafter as a FDB cache, preferably comprising a two-way set-associative cache. The cache entries identify the respective output ports to which the switch is to send packets with certain MAC addresses. These port assignments are read into the cache from a much larger FDB, such as the 64K-entry FDB used in InfiniBand switches.

When a packet arrives at an input port of the switch, the port looks up the destination MAC address of the packet in its FDB cache, preferably using a few of the least significant bits of the address as the lookup index. When the MAC address matches the target stored in the cache for the given index (i,e., when there is a cache hit), the switch sends the packet to the output port indicated in the cache. The port thus saves considerable processing time by avoiding having to read the port from the FDB itself, as well as conserving bandwidth used in FDB access. Since it is common in a switch fabric for a sequence of packets to be sent along the same route, the likelihood of a cache hit is high. In the event of a cache miss, the input port looks up the MAC address in the FDB. Preferably, the input port inserts the new MAC address and its corresponding port in the cache, most preferably replacing the least-recently-used (LRU) entry having the same index as the current MAC address.

In some preferred embodiments of the present invention, the FDB cache also includes one or more control bits for each entry. Preferably, one of the control bits is a "force-hit" bit, which causes the input port to switch incoming packets to the output port indicated in the cache even when the MAC address of the packet does not match the cache target address. In one of these preferred embodiments, the caches at one or more of the ports are loaded so as to direct all incoming packets to one of the output ports to which a host is connected, and the force-hit bits are set. As a result, all of the incoming packets at these ports will be directed to the host for processing. This technique can be used, for example, to configure the switch and host to serve as a router, thus enhancing the versatility of switching devices using the FDB cache.

There is therefore provided, in accordance with a preferred embodiment of the present invention, a device for switching packets in a network, including:

a switching core;

a plurality of ports, coupled to pass the packets from one to another through the switching core, the ports including, with respect to each packet among the packets switched by the device, a receiving port, coupled to receive the packet from a packet source, and a destination port, to which the packet is passed for conveyance to a packet destination; and one or more cache memories, respectively associated with one or more of the ports, each of the cache memories being configured to hold a forwarding database cache for reference by the receiving port with which the cache memory is associated in determining the destination port of the packet.

Typically, the packets include respective packet addresses, such as media access control (MAC) addresses, and the forwarding database cache includes entries indicating the destination port for each of a selected plurality of the packet addresses. Preferably, the entries in the forwarding database cache are arranged in one or more tables, which are indexed by a segment of the packet addresses. Most preferably, the segment of the packet addresses includes a predetermined number of the least significant bits of the packet addresses. Additionally or alternatively, the one or more tables include at least two tables.

Further additionally or alternatively, each of the entries includes a target field, corresponding to at least a portion of one of the packet addresses with which the entry is associated, and the target field is compared to the portion of the packet addresses to determine that a cache hit has occurred, whereupon the receiving port reads the destination port from one of the tables. Preferably, when the cache hit does not occur with respect to one of the packets, the destination port is read from a forwarding database outside the cache memory. Most preferably, the destination port read from the forwarding database outside the cache memory is entered in the cache in place of a least recently used one of the entries having a given index.

Preferably, the forwarding database cache includes one or more tables including entries to which the receiving port refers the packets that it receives, each such entry including a target field and a data value indicating the destination port to which the packet should be passed when the packet matches the target field.

In a preferred embodiment, at least some of the entries further include a force-hit flag, such that when the force-hit flag is set in the entry to which the packet is referred, the packet is passed to the destination port indicated by the entry even when the packet does not match the target field. Preferably, the entries in at least one of the one or more tables are configurable so that the data value for all of the entries can be set to indicated the same destination port, and the force-hit flag of all of the entries can be set so that all of the packets received at the receiving port are passed to the same destination port. Most preferably, the one or more cache memories include a multiplicity of cache memories respectively associated with a multiplicity of the ports, and wherein the entries in the multiplicity of the cache memories can be set so that all of the packets received at the multiplicity of the ports are passed to the same destination port. Further preferably, the device includes a host processor, coupled to the destination port so as to receive the packets from the multiplicity of the ports, and to process the packets so as to route them through the network.

Preferably, the device also includes a device memory, configured to hold a forwarding database, from which information is read for caching in the one or more cache memories.

There is further provided, in accordance with a preferred embodiment of the present invention, a method for switching packets in a network, including:

providing a forwarding database containing information indicating a destination port for each of the packets that is received at one of a plurality of ports of a switch in the network;

copying a subset of the information in the forwarding database to a forwarding database cache in a cache memory associated with each of one or more of the ports of the switch;

reading the information from the cache memory at one of the ports, responsive to receiving one of the packets at the port, in order to determine the destination port for the packet; and passing the packet through the switch to the destination port.

The present invention will be more fully understood from the following detailed description of the preferred embodiments thereof, taken together with the drawings in which:

DETAILED DESCRIPTION OF PREFERRED EMBODIMENTS

Figure 1:
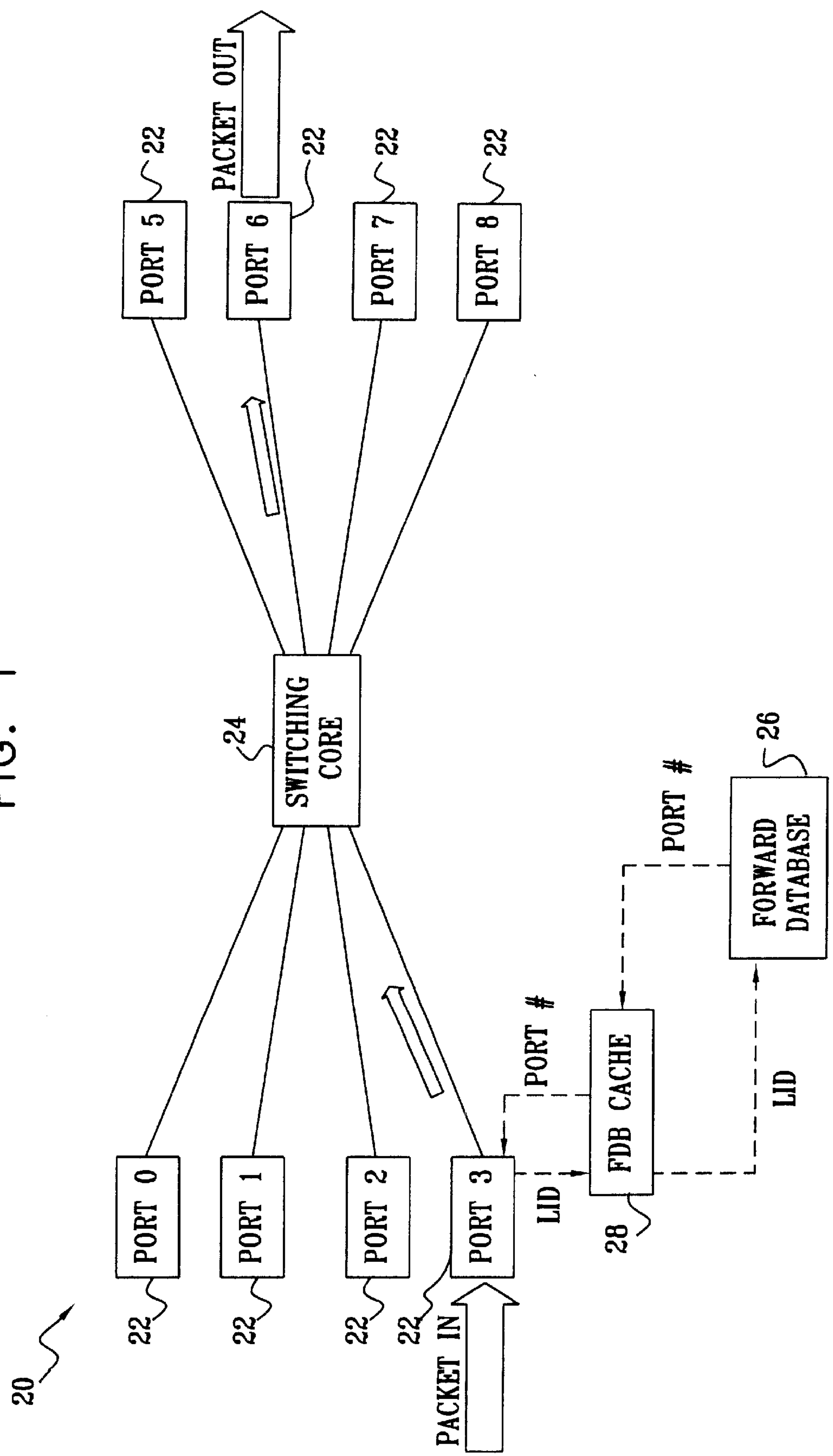
FIG. 1 is a block diagram that schematically illustrates a packet switch, in accordance with a preferred embodiment of the present invention.

FIG. 1 is a block diagram that schematically illustrates a switch 20 used in a packet network, such as an InfiniBand switch fabric, in accordance with a preferred embodiment of the present invention. Switch 20 comprises a plurality of bi-directional ports 22. When an incoming packet is received at one of the ports (PORT 3 in the present example), the receiving port must pass the packet through a switching core 24 to the destination port through which the packet is to be output from the switch (PORT 6). The destination port for every possible packet LID (i.e., MAC addresses) is stored in a forwarding database (FDB) 26 held in a memory of switch 20.

In order to determine the destination port to which the packet should be sent, the receiving port reads the packet header to determine its LID and looks up the LID in a FDB cache memory 28. When the LID matches one of the cache entries (a cache hit), the receiving port reads the identity of the required destination port from the cache and passes the packet on to core 24 for switching to the destination port. Otherwise, in the case of a cache miss, the entire LID is used as an lookup index to FDB 26, as in conventional switches. Preferably, after reading the appropriate entry from the FDB, the receiving port stores the entry in cache 28 in place of the least-recently-used (LRU) entry in the table having the same index.

Figure 2:
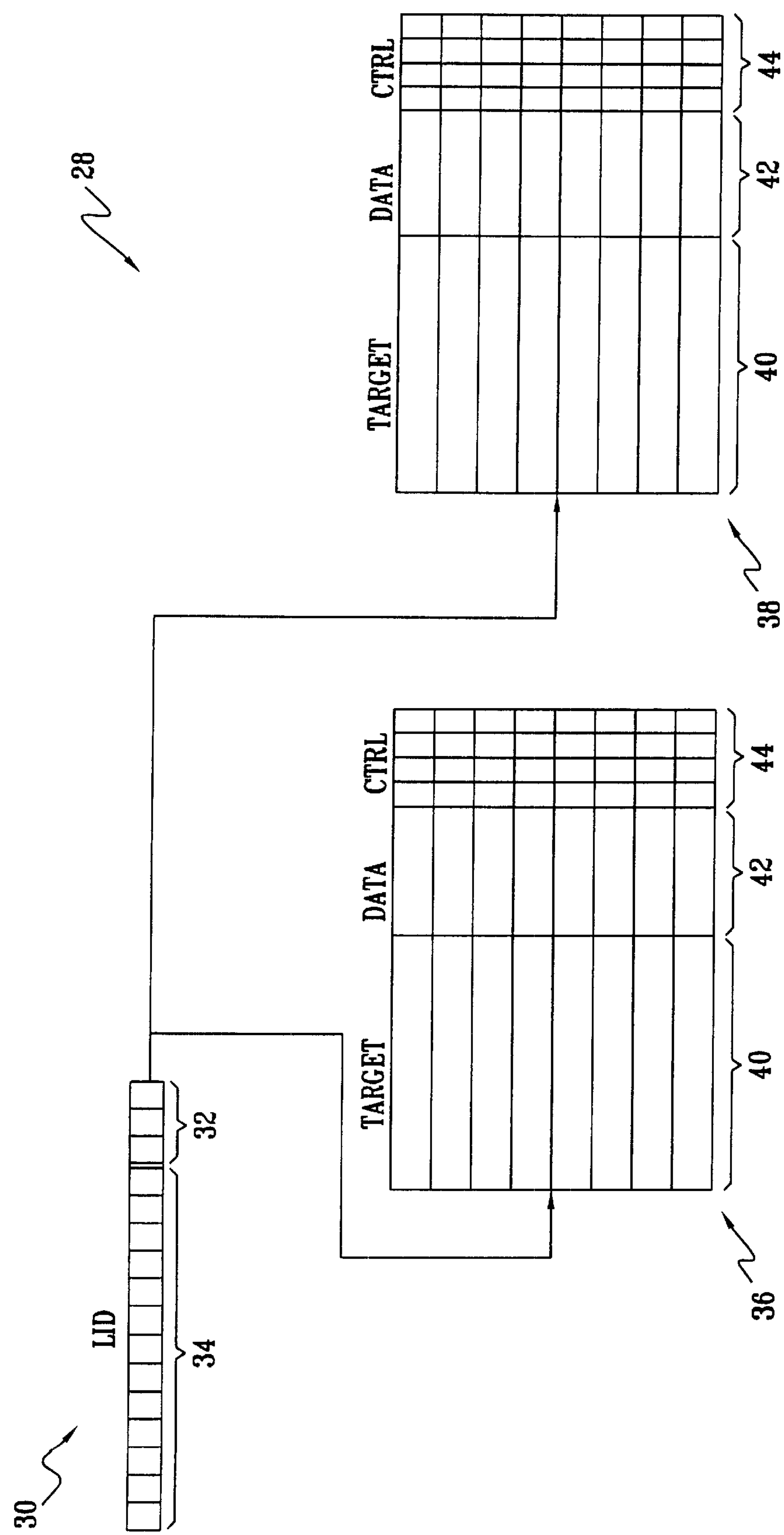
FIG. 2 is a block diagram that schematically illustrates a lookup operation in a forwarding database (FDB) cache, in accordance with a preferred embodiment of the present invention.

FIG. 2 is a block diagram that schematically illustrates lookup of a LID 30 of an incoming packet in FDB cache 28, in accordance with a preferred embodiment of the present invention. As shown in the figure and described hereinbelow, cache 28 is a two-way set-associative cache, comprising two tables 36 and 38 of eight entries each. LID 30 comprises sixteen bits, of which the three least significant bits (LSB) 32 are used as the cache index. The three LSB are used to select an entry in each of tables 36 and 38. The thirteen most significant bits (MSB) 34 of the LID are then compared to a thirteen-bit target value 40 of the selected entry in each of the tables. A cache hit occurs when MSB 34 match target 40 in either of the tables. In this case, the port reads out a data value 42 from the corresponding table entry, which identifies the destination port to which the packet is to be switched. The data value is preferably eight bits long, as specified by the InfiniBand standard, but may alternatively be shorter. For example, a five-bit value is sufficient for a typical twenty-port switch.

Preferably, each entry in tables 36 and 38 also contains control bits 44. These bits are used to attach instructions to the specific entries and preferably include the following flags:

Lock—disables replacement of the cache entry.

When the lock flag is set, the entry will not be replaced by any other entry read from FDB 26, even when the locked entry is the least-recently used entry in the table.

- Valid—defines whether the current entry is valid. If not, the port must read the destination port from FDB 26.
- Force hit—when this bit is set, lookups to this entry will result in a "cache hit," even if the LID of the incoming packet does not match target 40. The destination port listed in data value 42 will be used in any case.
- LRU—identifies the least-recently used of the two entries for a given index value of LSB 32. A single LRU bit per entry is sufficient for tables 36 and 38 together. The bit is reset to indicate that the least-recently used entry is the one in table 36, and set to indicate that the least-recently used entry is the one in table 38.

The inventors have found the arrange of cache 28, with two tables 36 and 38 of eight entries each, to provide a convenient cache size without requiring excessive logic circuitry for cache checking an management. In alternative embodiments of the present invention, not shown in the figures, the cache may comprise only a single table, or three or more tables, with fewer or greater than eight entries. Similarly, although LSB 32 of LID 30 serve as a convenient index, other portions of the LID, or even other parts of the address or control information carried by incoming packets, may be used as the cache index instead of LSB 32.

Figure 3:
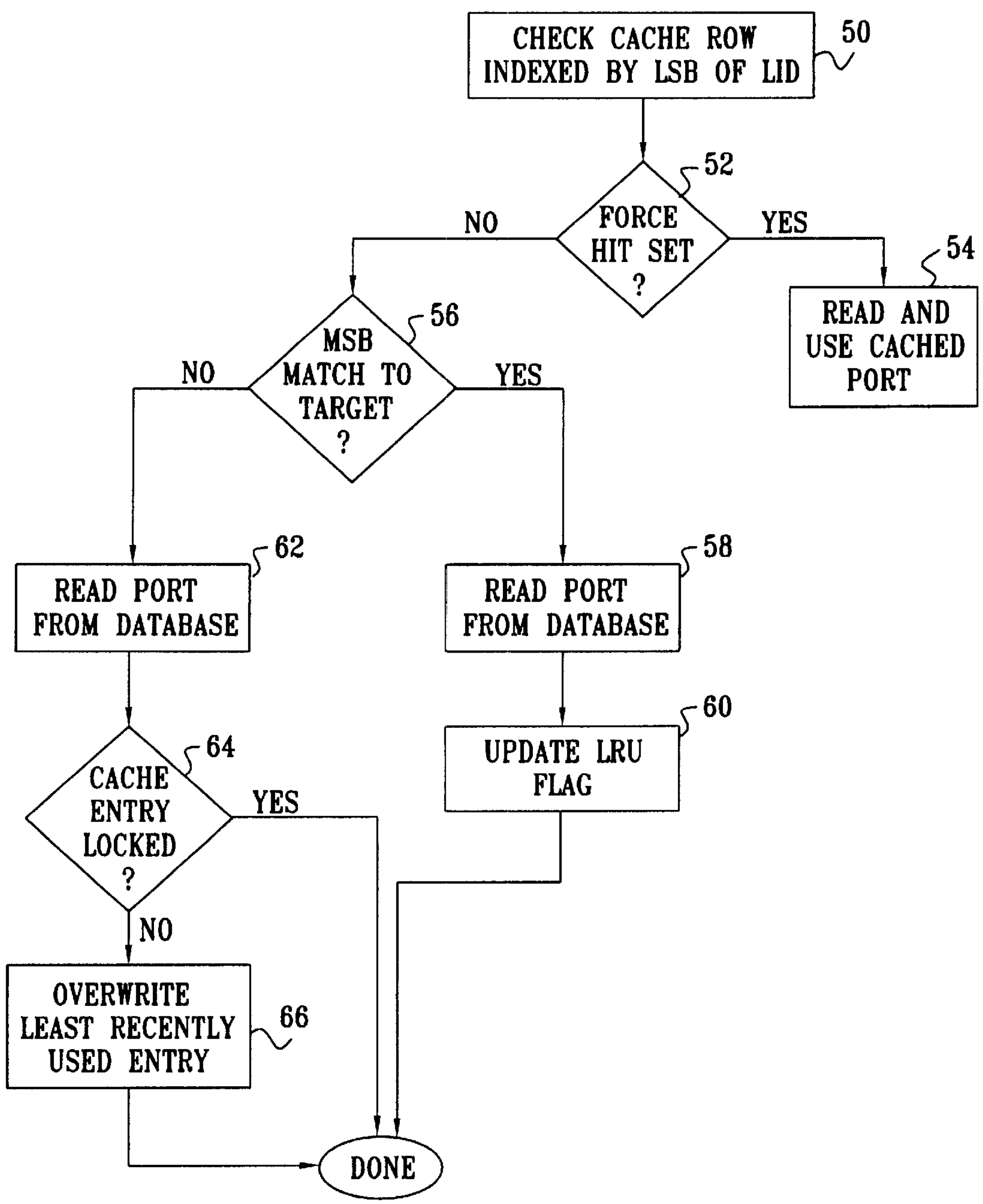
FIG. 3 is a flow chart that schematically illustrates a method for processing a local identifier (LID) using a FDB cache, in accordance with a preferred embodiment of the present invention.

FIG. 3 is a flow chart that schematically illustrates a method for using FDB cache 28 in processing an incoming packet at one of ports 22, in accordance with a preferred embodiment of the present invention. The port reads LSB 32 and uses them to check the entries in the rows of tables 36 and 38 indexed by the LSB, at a lookup step 50. If the "force hit" bit is set at the indexed row in either of the tables, at a force hit step 52, the port reads data value 42 for that row without checking target 40 against MSB 34. The packet is then switched to the destination port indicated in the table, at a forced switching step 54.

If the "force hit" bit is not set, MSB 34 of LID 30 are compared to target 40 in both of the indexed rows, at a MSB matching step 56. If there is a match, indicating a cache hit, the port reads and uses data value 42 from the row at which it found a match, at a cache reading step 58 (assuming the "valid" flag for the entry is set). If necessary, the port updates the LRU flags of the indexed row in both tables, so that the entry that was not matched by the current LID is marked as the least recently used, at a LRU update step.

If at step 56, MSB 34 of the current LID do not match target 40 in either table (a cache miss), the destination port for the packet is read from FDB 26, at a database reading step 62. After reading the destination port from the FDB, the input port will attempt to write the current MSB and destination port to cache 28, in place of the least recently used entry in the cache. Before doing so, the port must check whether the "lock" flag is set for the entry in question, at a locking check 64. If so, the entry will not be overwritten. If the flag is reset, however, the input port is free to overwrite the least recently used entry, at an overwriting step 66. The use of two parallel tables 36 and 38, with toggling of the LRU flag, reduces "thrashing," i.e., continual FDB lookup and replacement of cache entries.

Figure 4A:
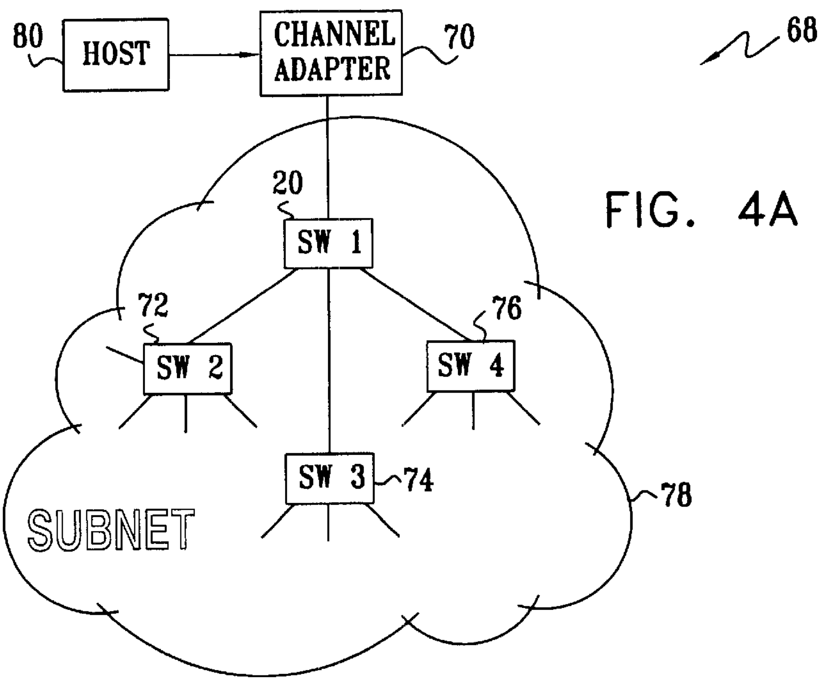
FIGS. 4A and 4B are block diagrams illustrating alternative configurations of a switch fabric, implemented using a FDB cache, in accordance with a preferred embodiment of the present invention.
Figure 4B:
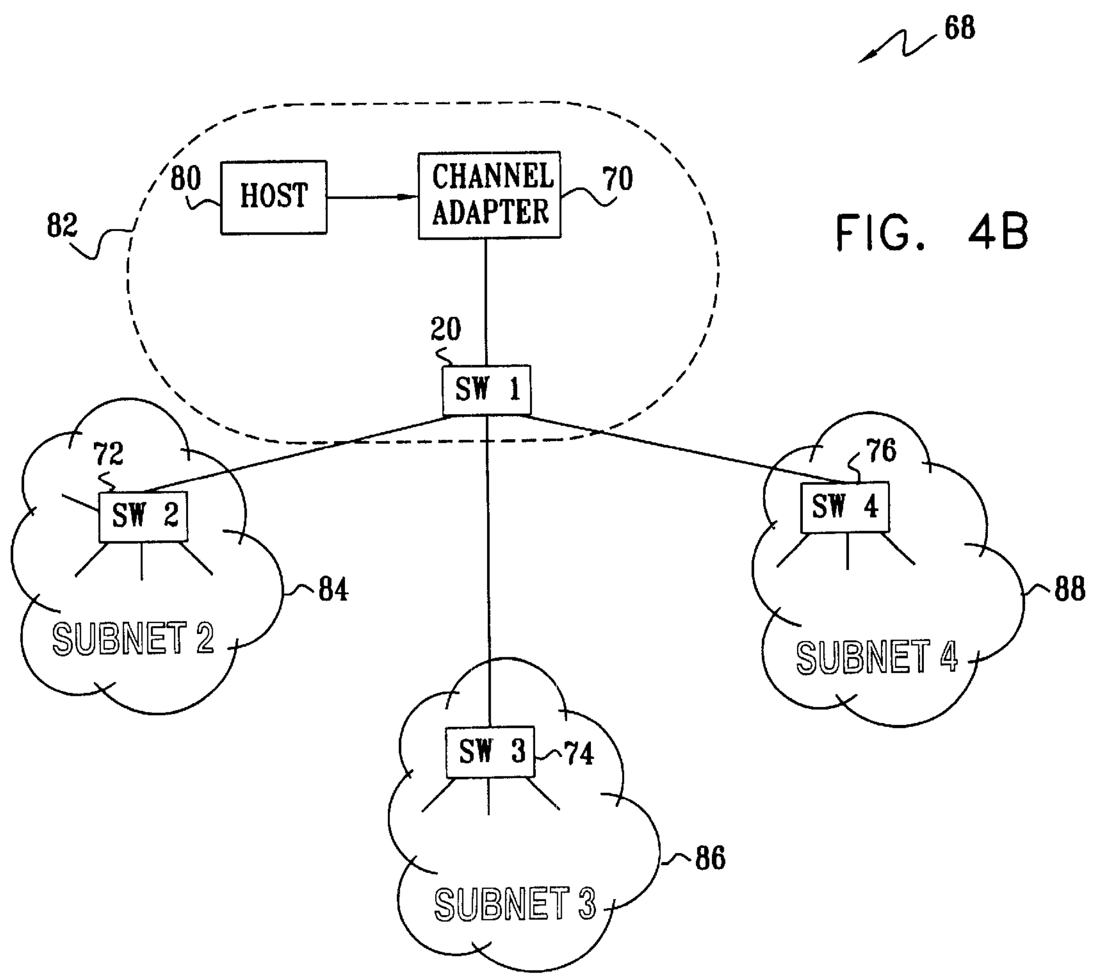

FIGS. 4A and 4B are block diagrams that schematically illustrate alternative configurations of a switch fabric 68, which are implemented using FDB caches 28, in accordance with a preferred embodiment of the present invention. FIG. 4A shows a conventional configuration of a subnet 78 of fabric 68, containing switch 20, along with additional switches 72, 74, 76. A host processor 80 is connected via a channel adapter 70 to one of ports 22 (FIG. 1) of switch 20. The FDB caches of switch 20 enable switch 72, for example, to pass packets via switch 20 to switch 74 or 76 or to host 80 through adapter 70. Typically, the "force hit" flags in the FDB caches are not set.

In the configuration of FIG. 4B, on the other hand, the "force hit" flags in the FDB caches of switch 20 are set, and the cache entries are loaded so that all packets sent to switch 20 from switches 72, 74 and 76 are passed to the port of switch 20 that serves channel adapter 70. This configuration is useful, for example, in implementing a network router 82, based on switch 20 and host 80. The router transfers packets among subnets 84, 86 and 88, in which switches 72, 74 and 76 respectively serve as the endpoint switches between their respective subnets and the router. As a result of the settings in its FDB caches 28, switch 20 passes all of the packets that it receives from the endpoint switches to host 80. The host performs network address processing functions and returns the packets to switch 20 for conveyance to the appropriate subnet.

No hardware changes are required in order to change the configuration of fabric 68 between the configurations of FIGS. 4A and 4B. It is also easy to arrange "hybrid" configurations, such as configurations in which some of the ports of switch 20 are forced to transfer packets to host 80, while others maintain normal switching operation.

Although preferred embodiments are described herein with reference to conventions of InfiniBand fabrics, the switching and routing functions exemplified in these embodiments are common to all sorts of packet networks. Thus, the principles of the present invention may similarly be applied in switching devices used in networks of other sorts. It will therefore be appreciated that the preferred embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

What is claimed is:

1. A device for switching packets in a network, comprising:

a switching core;

a plurality of ports, coupled to pass the packets from one to another through the switching core, the ports comprising, with respect to each packet among the packets switched by the device, a receiving port, coupled to receive the packet from a packet source, and a destination port, to which the packet is passed for conveyance to a packet destination; and one or more cache memories, respectively associated with one or more of the ports, each of the cache memories being configured to hold a forwarding database cache for reference by the receiving port with which the cache memory is associated in determining the destination port of the packet.

2. A device according to claim 1, wherein the packets comprise respective packet addresses, and wherein the forwarding database cache comprises entries indicating the destination port for each of a selected plurality of the packet addresses.

3. A device according to claim 2, wherein the packet addresses comprise media access control (MAC) addresses.

4. A device according to claim 2, wherein the entries in the forwarding database cache are arranged in one or more tables, which are indexed by a segment of the packet addresses.

5. A device according to claim 4, wherein the segment of the packet addresses comprises a predetermined number of the least significant bits of the packet addresses.

6. A device according to claim 4, wherein the one or more tables comprise at least two tables.

7. A device according to claim 2, wherein each of the entries comprises a target field, corresponding to at least a portion of one of the packet addresses with which the entry is associated, and wherein the target field is compared to the portion of the packet addresses to determine that a cache hit has occurred, whereupon the receiving port reads the destination port from one of the tables.

8. A device according to claim 7, wherein when the cache hit does not occur with respect to one of the packets, the destination port is read from a forwarding database outside the cache memory.

9. A device according to claim 8, wherein the destination port read from the forwarding database outside the cache memory is entered in the cache in place of a least recently used one of the entries having a given index.

10. A device according to claim 1, wherein the forwarding database cache comprises one or more tables comprising entries to which the receiving port refers the packets that it receives, each such entry comprising a target field and a data value indicating the destination port to which the packet should be passed when the packet matches the target field.

11. A device according to claim 10, wherein at least some of the entries further comprise a force-hit flag, such that when the force-hit flag is set in the entry to which the packet is referred, the packet is passed to the destination port indicated by the entry even when the packet does not match the target field.

12. A device according to claim 11, wherein the entries in at least one of the one or more tables are configurable so that the data value for all of the entries can be set to indicated the same destination port, and wherein the force-hit flag of all of the entries can be set so that all of the packets received at the receiving port are passed to the same destination port.

13. A device according to claim 12, wherein the one or more cache memories comprise a multiplicity of cache memories respectively associated with a multiplicity of the ports, and wherein the entries in the multiplicity of the cache memories can be set so that all of the packets received at the multiplicity of the ports are passed to the same destination port.

14. A device according to claim 13, and comprising a host processor, coupled to the destination port so as to receive the packets from the multiplicity of the ports, and to process the packets so as to route them through the network.

15. A device according to claim 1, and comprising a device memory, configured to hold a forwarding database, from which information is read for caching in the one or more cache memories.

16. A method for switching packets in a network, comprising:

providing a forwarding database containing information indicating a destination port for each of the packets that is received at one of a plurality of ports of a switch in the network;

copying a subset of the information in the forwarding database to a forwarding database cache in a cache memory associated with each of one or more of the ports of the switch;

reading the information from the cache memory at one of the ports, responsive to receiving one of the packets at the port, in order to determine the destination port for the packet; and passing the packet through the switch to the destination port.

17. A method according to claim 16, wherein the packets comprise respective packet addresses, and wherein the information contained in the forwarding database indicates the destination port for each of the packet addresses, and wherein copying the subset of the information comprises saving in the cache memory the destination port indicated in the forwarding database for each of a selected plurality of the packet addresses.

18. A method according to claim 17, wherein the packet addresses comprise media access control (MAC) addresses.

19. A method according to claim 17, wherein the forwarding database cache comprises one or more tables, and wherein reading the information comprises reading an entry from the tables that is indexed by a segment of one of the packet addresses.

20. A method according to claim 19, wherein reading the entry from the tables comprises reading the entry that is indexed by a predetermined number of the least significant bits of the packet addresses.

21. A method according to claim 19, wherein each of the entries comprises a target field, corresponding to at least a portion of the packet addresses, and wherein reading the information comprises comparing the target field of the indexed entries in each of the tables to the portion of the packet addresses in the packet in order to determine that a cache hit has occurred, and reading the destination port from the cache when the cache hit has occurred.

22. A method according to claim 21, wherein copying the subset of the information comprises, when the cache hit does not occur, reading the destination port from the forwarding database and entering the destination port read from the forwarding database into the cache in place of a least recently used one of the indexed entries.

23. A method according to claim 19, wherein the one or more tables comprise at least two tables.

24. A method according to claim 19, wherein the forwarding database cache comprises one or more tables comprising entries, each such entry including a target field and a data value indicating the destination port, and wherein reading the information comprises comparing the packet to the target field, and passing the packet comprises passing the packet to the destination port indicated by the entry when the packet matches the target field.

25. A method according to claim 24, wherein at least some of the entries further comprise a force-hit flag, such that when the force-hit flag is set in one of the entries, passing the packet comprises passing the packet to the destination port indicated by the entry even when the packet does not match the target field.

26. A method according to claim 25, and comprising setting the destination port for all of the entries in the cache to the same one of the ports, and setting the force-hit flag of all of the entries so that all of the packets received at the receiving port are passed to the same destination port.

27. A method according to claim 26, wherein the one or more cache memories comprise a multiplicity of cache memories respectively associated with a multiplicity of the ports, and wherein setting the destination port and the force-hit flag comprises setting the destination port and the force-hit flag in the multiplicity of cache memories so that all of the packets received at the multiplicity of the ports are passed to the same destination port.

28. A method according to claim 27, and comprising coupling a host processor to the destination port so as to receive the packets from the multiplicity of the ports, and processing the packets using the host processor so as to route the packets through the network.

* * * * *